Patented Dec. 26, 1922.

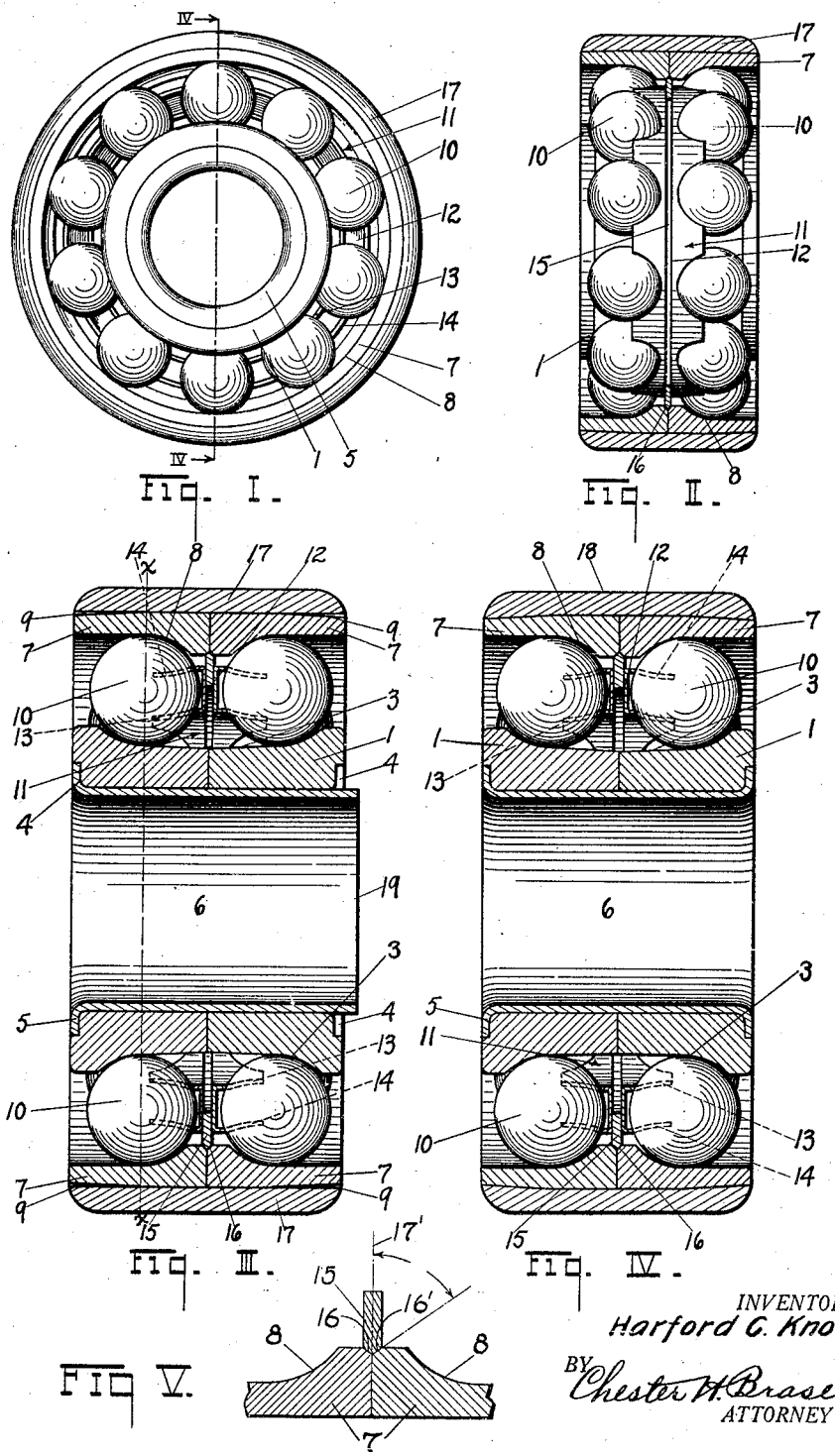

1,439,901

UNITED STATES PATENT OFFICE.

HARFORD C. KNOWLES, OF ELMIRA, NEW YORK, ASSIGNOR TO THE WILLYS-MORROW COMPANY, OF ELMIRA, NEW YORK, A CORPORATION OF OHIO.

ANTIFRICTION BEARING.

Application filed August 11, 1919. Serial No. 316,870.

*To all whom it may concern:*

Be it known that I, HARFORD C. KNOWLES, residing at Elmira, county of Chemung, State of New York, have invented certain new and useful Improvements in Antifriction Bearings, of which I declare the following to be a full, clear, and exact description.

This invention relates to an improved anti-friction bearing and particularly to bearings of this character provided with two rows of anti-friction elements commonly known as double row bearings. In constructing bearings of this type it is found to be desirable to employ retainers or cages for spacing the anti-friction elements of each race from each other, and in the particular form of the retainer employed by applicant which is of light construction it has been found to be desirable to insert a fixed plate or member between the two rows of anti-friction elements in such a manner as to form a support for the base portions of the two retainers and thus space the retainers from each other, and at the same time maintain the retainers in proper position relative to the anti-friction elements of each row.

One object of the invention is to provide an improved bearing wherein the retaining members are spaced from each other, while at the same time they are supported in proper position relative to the anti-friction elements of each row.

A further object of the invention is to provide an improved means for suitably supporting a pair of independently movable retainers in position relative to the anti-friction elements of the two rows whereby the retainers are capable of movement independently of each other while being retained in proper position relative to the anti-friction elements.

A further object of the invention is to provide suitable means for mounting the fixed plate between the retainer members whereby the plate may be readily inserted between the retainers and securely held in fixed position therebetween.

A further object of the invention is to provide an improved form of anti-friction bearing which is of simple construction and efficient in operation.

Further objects of this invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention is illustrated in the accompanying drawing forming a part hereof in which:

Figure I is an end elevational view of the completed bearing.

Figure II is a longitudinal view, partially in section, illustrating the relative position of the anti-friction elements with respect to each other and to the other elements of the bearing.

Figure III is a longitudinal sectional view of the bearing showing the process of assembling the various parts.

Figure IV is a longitudinal sectional view of the bearings, taken along the line IV—IV of Figure I.

Figure V is an enlarged detail sectional view showing the manner of seating the spacing plate between the outer bearing members, and the shape and angle of the groove formed in the bearing members.

In the embodiment of the invention illustrated herewith, 1 designates inner bearing members of similar construction, each of which is provided with a curved inclined bearing surface 3 so arranged as to be inclined toward the central portion of the bearing when the members 1 are in assembled position. Each of the inner bearing members 1 is provided with an annular groove 4 formed upon one end thereof, and adapted to receive an out-turned flange 5 formed upon the end portion of the inner tubular sleeve 6 when the inner bearing members are properly assembled upon the tubular sleeve.

A pair of outer bearing members 7 are employed, each of which is provided with a curved inner bearing surface 8 and has a conical or inclined outer surface as indicated at 9. The conical or inclined surface formed upon the outer faces of the bearing members 7 may be extended a greater or less distance from the outer edge of each bearing member, but this inclination is preferably commenced at such a point upon the outer bearing members as to be in radial alignment with the centers of the anti-friction elements carried by the bearing member as indicated by the line x—x in Figure III. By having the inclined surface commence at this point the greatest stress occasioned by bending or swaging down the outer ends of the casing member is exerted along the line of the centers of the anti-friction elements whereby the outer bearing member is supported. One of the outer bearing members 7 is adapted to be oppositely positioned with respect to each of the inner bearing members 1 when the various parts are in assembled position, and interposed between each set of opposed bearing members are a plurality of anti-friction elements 10 of the usual construction. Positioned between the two rows of anti-friction elements are a pair of similarly constructed retainer rings or cages 11 each of which is provided with a flat base portion 12 and has extending outwardly from the side edges thereof a plurality of inner prongs 13 and outer prongs 14. The inner and outer prongs 13 and 14 are positioned to extend between the adjacent balls or anti-friction elements properly spaced from each other and in suitable position relative to the remaining parts of the bearing.

The annular ring or plate 15 is sprung into or assembled so as to lie within an annular groove 16 formed in the meeting edges of the outer bearing members 7 and extends between the base portions of the retainers to maintain the same in spaced relation relative to each other and support them in proximity to the anti-friction elements with which they respectively engage. It has been found that the plate 15 may be best clamped in position between the outer bearing members by forming the groove 16 so that each of the side faces 16' thereof make an angle of somewhat greater than 45° with the radial line 17' extending outwardly from the center of the bearing. With the groove formed in this way a proper degree inwardly directed radial pressure is exerted upon the plate 15 by the outer bearing members as they are forced together within the outer casing to suitably clamp the plate rigidly and hold the same firmly in position. While as previously stated the annular plate or ring 15 is shown as being positioned within the groove 16 formed between the mating faces of the outer bearing member 7 and this construction is preferable, it is to be understood that this plate or ring may be retained in proper position within the bearing by any other suitable means such as by being supported by the inner bearing members 1 in a manner similar to that in which it is shown as supported by the outer bearing member, or by being positioned between the meeting faces of the outer bearing members and extending therefrom within the bearing, or by being supported by both the inner and outer bearing members and extending across the entire space between the inner and outer bearing member.

A casing member 17 of cylindrical form is provided for enclosing the outer surfaces of the outer bearing members 7 and overlies the outer inclined or conical surfaces of the outer bearing members. When the various elements making up the bearing are in assembled position the outer portions of the casing 17 are spun inwardly so as to be forced against and bear throughout a portion of their extent upon the inclined or conical surfaces of the outer bearing members to securely retain these parts in position. After the outwardly extending portions of the casing member have been forced into contact with the outer conical or inclined portions of the outer bearing members and the bearing assembled, the outer surface of the casing member is ground slightly as indicated at 18 so as to reduce the central portion thereof a sufficient amount to compensate for the slight inward bending of the outwardly extending portions thereof, and thus give the outer casing member an exterior surface of true cylindrical form.

In assembling the various parts of the bearing above described, the two outer bearing members 7 are positioned within the outer casing member 17 with the plate 15 located between the outer bearing members. The outer bearing members are then forced inwardly to securely grip the plate 15 between the beveled faces 16' formed on the bearing members, whereupon the outwardly extending end portions of the casing are spun down upon the outer conical or inclined surfaces of the outer bearing members to firmly grip the same and form a substantially unitary structure comprising the outer bearing members, the outer casing and the plate clamped between the outer bearing members. The inclined bearing surfaces 8 are then ground upon the inner faces of the bearing members, when the outer portion of the bearing is ready for final assemblage. One of the inner bearing members, both of which have had an inclined bearing surface ground thereon, is slid upon the outer surface of the inner tubular member and forced thereon until the flange 5 formed on one end of the tubular member seats within the annular recess formed in the inner bearing member. The combined outer casing, outer bearing members and plate is then slipped over the inner bearing member, and the retainer ring and anti-friction elements of one race are in place. The other retainer and the anti-friction elements co-operating therewith are then placed in position, and the other inner bearing member slid over the tubular member whereupon the parts occupy the position illustrated in Fig. III of the drawings except that the outwardly extending end portions of the casing have been spun down into contact with the outer conical or inclined surfaces of the outer bearing members. After the parts of the bearing have been thus assembled the end 19 of the tubular member is pressed outwardly into the groove 4 formed in the inner bearing member, whereby the several parts are firmly held in assembled position. The inner surface of the inner tubular member 6 is then ground to give it a smooth inner surface to fit tightly upon the outer surface of the shaft by which it is to be supported, and the outer central portion of the outer casing member is ground down as indicated at 18 to give the casing member a true cylindrical outer surface, concentric with the inner cylindrical surface of the tubular sleeve. It will be apparent that the degree of inclination of the outer surface of the outer bearing members is very slight, and therefore the outwardly extending end portions of the casing 17 will be bent very slightly when forced into engagement with the outer surface of the outer bearing members, consequently the outer central portion of the casing requires only a slight amount of grinding in order to give the same a truly cylindrical outer surface.

It will be apparent from the above description that when the parts are thus assembled in position the curved inclined inner surfaces of the outer bearing members serve to retain the two rows of anti-friction elements together with the retainers co-operating therewith in proper position relative to each other, and positively prevents these elements from becoming disengaged from the other parts of the bearing. It will be observed also that the retainers are supported in proper position relative to the anti-friction elements with which they respectively co-operate by means of the annular ring or plate interposed between the bases of the retainers, while the retainers are free to rotate independently of each other in accordance with the movement of the anti-friction elements. The retainers illustrated and described herewith being of comparative light construction are capable of moving freely with the anti-friction elements with which they are associated, and when supported in operative position relative to the anti-friction elements by means of the annular plate retain the anti-friction elements in proper spaced relation to each other.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In a double row ball bearing, inner and outer bearing members, rows of anti-friction elements interposed between the inner and outer bearing members, a pair of ball retainers positioned between the adjacent rows of anti-friction elements, and a fixed plate located between the retainers and supporting the same in engagement with the anti-friction elements.

2. In an anti-friction bearing, inner and outer bearing members, rows of anti-friction elements interposed between said inner and outer bearing members, a pair of retainers provided with flattened base portions interposed between adjacent rows of said anti-friction elements, and means supported by the outer bearing members extending between the retainers and supporting the same in engagement with the anti-friction elements.

3. In an anti-friction bearing, inner and outer bearing members, anti-friction elements interposed between said inner and outer bearing members and arranged in rows, a pair of retainers positioned between adjacent rows of anti-friction elements, each retainer co-operating with the anti-friction elements of one row, and means supported by the outer bearing members and extending between the said retainers for supporting the retainers relative to the anti-friction elements.

4. In an anti-friction bearing, inner and outer bearing members, two series of anti-friction elements interposed between the inner and outer bearing members, a pair of retainers positioned between the two series of anti-friction elements, and means supported by certain of the bearing members for maintaining the retainers in spaced relation with respect to each other.

5. In an anti-friction bearing, a pair of races including anti-friction elements, a pair of similarly constructed retainers located between the races, each of the retainers being provided with a base portion and projections extending from the opposite side edges of the base portion adapted to be positioned between adjacent anti-friction elements for the purpose of maintaining the anti-friction elements of each race in spaced relation relative to each other, and a plate fixedly positioned between the base portions of the retainers for supporting the same.

6. In an anti-friction bearing, a pair of races comprising anti-friction elements, a pair of retainers located between the races, each of the retainers being adapted to co-operate with the anti-friction elements of one race for the purpose of maintaining the same in spaced relation relative to each other, each retainer being provided with seats for the anti-friction elements constructed in such a manner as to normally bear against each anti-friction element only at points substantially in line with the axis of rotation of the elements, and a plate fixedly positioned between the retainers for supporting the same.

7. In an anti-friction bearing, a pair of races comprising anti-friction elements, a pair of independently movable retainers located between the races, and a plate located between said retainers and supporting the same in proper position relative to the anti-friction elements.

8. In an anti-friction bearing, a pair of races comprising anti-friction elements, a pair of independently movable retainers located between the races, each of said retainers comprising a base portion, spaced projections extending from opposite edges of the base portion and adapted to extend between adjacent anti-friction elements for the purpose of maintaining them in suitable spaced relation to each other, and means fixedly positioned between the base portions of the retainers for supporting said retainers in proper position relative to the anti-friction elements.

9. In a bearing, a pair of races comprising anti-friction elements, a pair of independently movable retainers located between the races, and fixedly positioned means located between said retainers and supporting the same in proper position relative to the anti-friction elements.

10. In an anti-friction bearing, inner and outer bearing members, two series of anti-friction elements interposed between the inner and outer bearing members, a pair of retainers positioned between the two series of anti-friction elements, and means fixedly positioned with respect to the bearing members for supporting the retainers in spaced relation to each other.

11. In an anti-friction bearing, inner and outer bearings the outer bearing comprising a pair of bearing members each of which is provided with a beveled portion, two series of anti-friction elements interposed between the inner and outer bearings, a pair of retainers positioned between the two series of anti-friction elements, and a plate provided with a beveled edge positioned between the retainers and having the beveled edge thereof seated between the beveled portions of the bearing members.

12. In an anti-friction bearing, a pair of races comprising anti-friction elements, a pair of independently movable retainers located between the races, a pair of bearing members each provided with a beveled portion, and a plate located between the retainers and having a beveled edge seated between the beveled portions of the bearing members.

In testimony whereof, I affix my signature.

HARFORD C. KNOWLES.